/ US 12,129,797 B2 //

(12) United States Patent
Reid (10) Patent No.: US 12,129,797 B2
(45) Date of Patent: Oct. 29, 2024

(54) HEAT MANAGEMENT SYSTEM FOR AIRCRAFT

(71) Applicant: Rolls-Royce plc, London (GB)

(72) Inventor: Mark P. Reid, Derby (GB)

(73) Assignee: Rolls-Royce PLC, London (GB)

( * ) Notice: Subject to any disclaimer, the term of this patent is extended or adjusted under 35 U.S.C. 154(b) by 0 days.

(21) Appl. No.: 18/463,641

(22) Filed: Sep. 8, 2023

(65) Prior Publication Data
US 2024/0110512 A1    Apr. 4, 2024

(30) Foreign Application Priority Data

Sep. 29, 2022 (GB) ..................... 2214270

(51) Int. Cl.
| | | |
|---|---|---|
| *F02C 7/14* | (2006.01) | |
| *B64D 27/10* | (2006.01) | |
| *F02C 7/06* | (2006.01) | |
| *F02C 7/224* | (2006.01) | |

(52) U.S. Cl.
CPC ............. *F02C 7/14* (2013.01); *B64D 27/10* (2013.01); *F02C 7/06* (2013.01); *F02C 7/224* (2013.01)

(58) Field of Classification Search
CPC .... F02C 7/06; F02C 7/14; F02C 7/224; F02C 7/236; B64D 27/10
See application file for complete search history.

(56) References Cited

U.S. PATENT DOCUMENTS

| | | | |
|---|---|---|---|
| 3,000,180 A | | 9/1961 | Mansfield et al. |
| 3,080,716 A | * | 3/1963 | Cummings ............... F02C 7/14 |
| | | | 60/39.83 |
| 4,705,100 A | * | 11/1987 | Black ..................... F01D 25/18 |
| | | | 165/41 |
| 5,121,598 A | | 6/1992 | Butler |
| 10,752,374 B1 | | 8/2020 | Lui et al. |
| 2006/0260323 A1 | | 11/2006 | Moulebhar |
| 2010/0089026 A1 | | 4/2010 | Baker et al. |

(Continued)

FOREIGN PATENT DOCUMENTS

| | | |
|---|---|---|
| CN | 114537686 A | 5/2022 |
| EP | 2843243 A1 | 3/2015 |

(Continued)

OTHER PUBLICATIONS

Great Britain search report issued in GB Patent Application No. 2214270.7 dated Mar. 23, 2023.

(Continued)

*Primary Examiner* — Steven M Sutherland (57) ABSTRACT

A heat management system includes a fuel tank storing a fuel; a first heat exchanger thermally coupled to the fuel tank; a hydraulic pump for circulating a hydraulic fluid; a hydraulic circuit including first and second hydraulic lines fluidly coupled to the first heat exchanger and the hydraulic pump, such that the first heat exchanger brings the hydraulic fluid and the fuel into a heat exchange relationship; an oil circuit; and a second heat exchanger thermally coupled to the oil circuit and at least one of the first and second hydraulic lines, such that the second heat exchanger brings the hydraulic fluid and the oil into a heat exchange relationship, thereby allowing heat transfer between the fuel and the oil via the hydraulic fluid.

13 Claims, 6 Drawing Sheets

(56) References Cited

U.S. PATENT DOCUMENTS

| | | |
|---|---|---|
| 2011/0023444 A1 | 2/2011 | Veilleux |
| 2013/0283811 A1 | 10/2013 | Potel et al. |
| 2016/0178204 A1 | 6/2016 | Wang et al. |
| 2020/0386249 A1 | 12/2020 | Adamson et al. |
| 2022/0106053 A1 | 4/2022 | Snyder |

FOREIGN PATENT DOCUMENTS

| | | |
|---|---|---|
| EP | 3127815 A1 | 2/2017 |
| EP | 3034839 B1 | 3/2020 |

OTHER PUBLICATIONS

European search report dated Jan. 31, 2024 issued in EP Patent Application No. 23195091.6.

* cited by examiner

HEAT MANAGEMENT SYSTEM FOR AIRCRAFT

CROSS-REFERENCE TO RELATED APPLICATIONS

This specification is based upon and claims the benefit of priority from United Kingdom patent application number GB 2214270.7 filed on Sep. 29, 2022, the entire contents of which is incorporated herein by reference.

BACKGROUND

Technical Field

The present disclosure relates to a heat management system for an aircraft powered by a gas turbine engine.

Description of the Related Art

Heat management systems aim to manage an engine oil and a fuel at optimal operating temperatures by transferring heat between the engine oil and the fuel. Heat management systems typically transfer heat from the engine oil to the fuel via a fuel oil heat exchanger in order to cool the engine oil and heat the fuel. However, it may not be viable to transfer heat from the engine oil to the fuel in cases where a temperature of the fuel is already above acceptable fuel temperature limits.

To this end, conventional heat management systems may utilise air sourced from within a gas turbine engine (e.g., air downstream of a fan of the gas turbine engine) and air-to-oil heat exchangers to transfer heat from the engine oil to the air in order to reduce/eliminate heat transfer from the engine oil to the fuel. However, the heat added to the air sourced from the gas turbine engine may be regarded as wasted energy. It may be desirable to utilise such wasted energy for potential improvement in an efficiency of the gas turbine engine. Moreover, such conventional heat management systems may necessitate addition of dedicated hardware to the gas turbine engine, which may detrimentally impact other parameters of the gas turbine engine, such as specific fuel consumption, engine noise, and the like. As transferring heat from the engine oil to the air may only be necessary during some phases of a flight in extreme conditions, the addition of the dedicated hardware may render such conventional heat management systems uneconomical.

There remains a need for a heat management system that can provide an integrated solution to the aforementioned deficiencies of the conventional heat management systems. Specifically, there is a need for a heat management system that can improve the efficiency of the gas turbine engine by retaining and utilising the heat from the engine oil between various systems of the aircraft and the gas turbine engine.

SUMMARY

According to a first aspect there is provided a heat management system for an aircraft powered by a gas turbine engine. The heat management system includes a fuel tank storing a fuel. The heat management system further includes a first heat exchanger thermally coupled to the fuel tank. The heat management system further includes a hydraulic pump for circulating a hydraulic fluid for hydraulically actuating one or more hydraulic components of the aircraft. The heat management system further includes a hydraulic circuit. The hydraulic circuit includes a first hydraulic line fluidly coupled to the first heat exchanger and the hydraulic pump. The hydraulic pump receives the hydraulic fluid from the first heat exchanger via the first hydraulic line. The hydraulic circuit further includes a second hydraulic line fluidly coupled to the first heat exchanger and the hydraulic pump. The hydraulic pump supplies the hydraulic fluid to the first heat exchanger via the second hydraulic line, such that the first heat exchanger brings the hydraulic fluid and the fuel into a heat exchange relationship. The heat management system further includes an oil circuit for circulating an oil to lubricate one or more components of the gas turbine engine requiring lubrication. The heat management system further includes a second heat exchanger thermally coupled to the oil circuit and at least one of the first hydraulic line and the second hydraulic line, such that the second heat exchanger brings the hydraulic fluid and the oil into a heat exchange relationship, thereby allowing heat transfer between the fuel and the oil via the hydraulic fluid.

The heat management system may utilise the hydraulic fluid to achieve heat transfer between the fuel and the oil. The heat management system may therefore manage the oil and the fuel at optimal operating temperatures when the aircraft undergoes extreme environmental conditions during flight. The heat management system may maintain the temperature of the fuel supplied from the aircraft (i.e., from the fuel tank) above 0° C., below which fuel-borne water becomes ice, by transferring heat from the oil to the fuel via the hydraulic fluid.

The heat management system may improve an efficiency of the gas turbine engine, as the first heat exchanger may allow heat energy from the oil to be added to the hydraulic fluid and utilised to increase the temperature of the fuel stored in the fuel tank via the hydraulic fluid. Additionally, the heat energy added to the hydraulic fluid from the oil may be utilised for various functions of the aircraft.

Advantageously, the heat management system may provide an integrated solution to temperature management of the oil and the fuel. The heat management system may make use of pre-existing systems (e.g., oil systems, hydraulic systems, and fuel systems) present in the gas turbine engine and the aircraft. As a result, the heat management system may be economical to include in the aircraft and the gas turbine engine.

In some embodiments, the heat management system further includes a fuel line fluidly coupled to the fuel tank. The heat management system further includes a fuel-oil heat exchanger (FOHE) fluidly coupled to the fuel line and the oil circuit, such that the FOHE brings the fuel and the oil into a heat exchange relationship. The heat management system further includes a low pressure fuel pump configured to supply the fuel from the fuel tank to the FOHE via the fuel line. The heat management system further includes a high pressure fuel pump configured to receive the fuel from the FOHE and supply the fuel to an engine line that is in fluid communication with one or more burners of the gas turbine engine.

The FOHE may transfer heat from the oil to the fuel, thereby preventing fuel-borne water from changing into ice. This may prevent clogging of a fuel filter of the gas turbine engine.

In some embodiments, the heat management system further includes an oil tank storing the oil. The heat management system further includes an oil pump configured to supply the oil from the oil tank to the FOHE. The heat management system further includes a scavenge pump configured to scavenge and supply the oil from the one or more components of the gas turbine engine to the oil tank.

In some embodiments, the oil circuit includes a first oil line fluidly coupled to the oil tank and the FOHE. The oil pump is configured to supply the oil from the oil tank to the FOHE via the first oil line. The oil circuit further includes a second oil line fluidly coupled to the FOHE and the one or more components. The second oil line is configured to supply the oil from the FOHE to the one or more components. The oil circuit further includes a scavenge line fluidly coupled to the one or more components of the gas turbine engine and the oil tank. The scavenge pump is configured to supply the oil from the one or more components to the oil tank via the scavenge line.

In some embodiments, the second heat exchanger is thermally coupled to the first oil line and the at least one of the first hydraulic line and the second hydraulic line.

In some embodiments, the second heat exchanger is thermally coupled to the scavenge line and the at least one of the first hydraulic line and the second hydraulic line.

In some embodiments, the heat management system further includes a bypass line fluidly coupled to the oil circuit, such that the bypass line bypasses the second heat exchanger. The heat management system further includes a valve fluidly coupled to the bypass line and operable to vary a flow of the oil through the bypass line.

In some embodiments, the valve is a variable position valve.

In some embodiments, the heat management system further includes a fuel temperature sensor configured to sense a temperature of the fuel. The heat management system further includes an oil temperature sensor configured to sense a temperature of the oil. The heat management system further includes a controller communicably coupled to each of the fuel temperature sensor and the oil temperature sensor. The controller is configured to control the valve to vary the flow of the oil in the bypass line based on the temperature of the fuel and the temperature of the oil.

In some embodiments, the heat management system further includes a fuel temperature sensor configured to sense a temperature of the fuel. The heat management system further includes an oil temperature sensor configured to sense a temperature of the oil. The heat management system further includes a controller communicably coupled to each of the fuel temperature sensor and the oil temperature sensor. The controller is configured to control the hydraulic pump to control a flow of the hydraulic fluid in the hydraulic circuit based on the temperature of the fuel and the temperature of the oil.

The controller may utilise data from the fuel temperature sensor and the oil temperature sensor to control both the hydraulic pump and the valve in order to maintain the fuel and the oil under their respective acceptable temperature limits.

According to a second aspect there is provided a gas turbine engine and a heat management system for an aircraft. The gas turbine engine comprises an engine core including a turbine, a compressor, and a core shaft connecting the turbine to the compressor. The gas turbine engine further includes a fan located upstream of the engine core. The fan includes a plurality of fan blades. The gas turbine engine further includes a gearbox that receives an input from the core shaft and outputs drive to the fan so as to drive the fan at a lower rotational speed than the core shaft. The heat management system comprises a heat management system according to the first aspect.

In some embodiments, the turbine is a first turbine, the compressor is a first compressor, and the core shaft is a first core shaft. The engine core further includes a second turbine, a second compressor, and a second core shaft connecting the second turbine to the second compressor. The second turbine, the second compressor, and the second core shaft are arranged to rotate at a higher rotational speed than the first core shaft.

According to a third aspect there is provided an aircraft including the heat management system according to the first aspect.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein. The gearbox may have any desired reduction ratio (defined as the rotational speed of the input shaft divided by the rotational speed of the output shaft), for example greater than 2.5, for example in the range of from 3 to 4.2, or 3.2 to 3.8, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. Purely by way of example, the gearbox may be a "star" gearbox having a ratio in the range of from 3.1 or 3.2 to 3.8. In some arrangements, the gear ratio may be outside these ranges.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, 17, 17.5, 18, 18.5, 19, 19.5 or 20. The bypass ratio may be in an inclusive range bounded by any two of the values in the previous sentence (i.e. the values may form upper or lower bounds), for example in the range of from 12 to 16, 13 to 15, or 13 to 14. The bypass duct may be substantially annular. The bypass duct may be radially outside the engine core. The radially outer surface of the bypass duct may be defined by a nacelle and/or a fan case.

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may be in an inclusive range bounded by any two of the values in the previous sentence (i.e., the values may form upper or lower bounds), for example in the range of from 80 $Nkg^{-1}s$ to 100 $Nkg^{-1}s$, or 85 $Nkg^{-1}s$ to 95 $Nkg^{-1}s$. Such engines may be particularly efficient in comparison with conventional gas turbine engines.

A fan blade and/or aerofoil portion of a fan blade described and/or claimed herein may be manufactured from any suitable material or combination of materials. For example, at least a part of the fan blade and/or aerofoil may be manufactured at least in part from a composite, for example a metal matrix composite and/or an organic matrix composite, such as carbon fibre.

The fan of a gas turbine as described and/or claimed herein may have any desired number of fan blades, for example 14, 16, 18, 20, 22, 24 or 26 fan blades.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

DESCRIPTION OF THE DRAWINGS

Embodiments will now be described by way of example only, with reference to the Figures, in which.

DETAILED DESCRIPTION

Aspects and embodiments of the present disclosure will now be discussed with reference to the accompanying figures. Further aspects and embodiments will be apparent to those skilled in the art.

As used herein, the term "controller" refers a computing device that couples to one or more other devices/circuits, e.g., switching circuits, etc., and which may be configured to communicate with, e.g., to control, such devices/circuits. The controller may include any device that performs logic operations. A controller may include a general processor, a central processing unit, an application specific integrated circuit (ASIC), a digital signal processor, a field programmable gate array (FPGA), a digital circuit, an analogue circuit, a microcontroller, any other type of controller, or any combination thereof.

As used herein, the term "communicably coupled" refers to direct coupling between components and/or indirect coupling between components via one or more intervening components. Such components and intervening components may include, but are not limited to, junctions, communication paths, components, circuit elements, circuits, functional blocks, and/or devices. As an example of indirect coupling, a signal conveyed from a first component to a second component may be modified by one or more intervening components by modifying the form, nature, or format of information in a signal, while one or more elements of the information in the signal are nevertheless conveyed in a manner than can be recognized by the second component.

As used herein, the terms "first" and "second" are used as identifiers. Therefore, such terms should not be construed as limiting of this disclosure. The terms "first" and "second" when used in conjunction with a feature or an element can be interchanged throughout the embodiments of this disclosure.

As used herein, "at least one of A and B" should be understood to mean "only A, only B, or both A and B."

Figure 1:
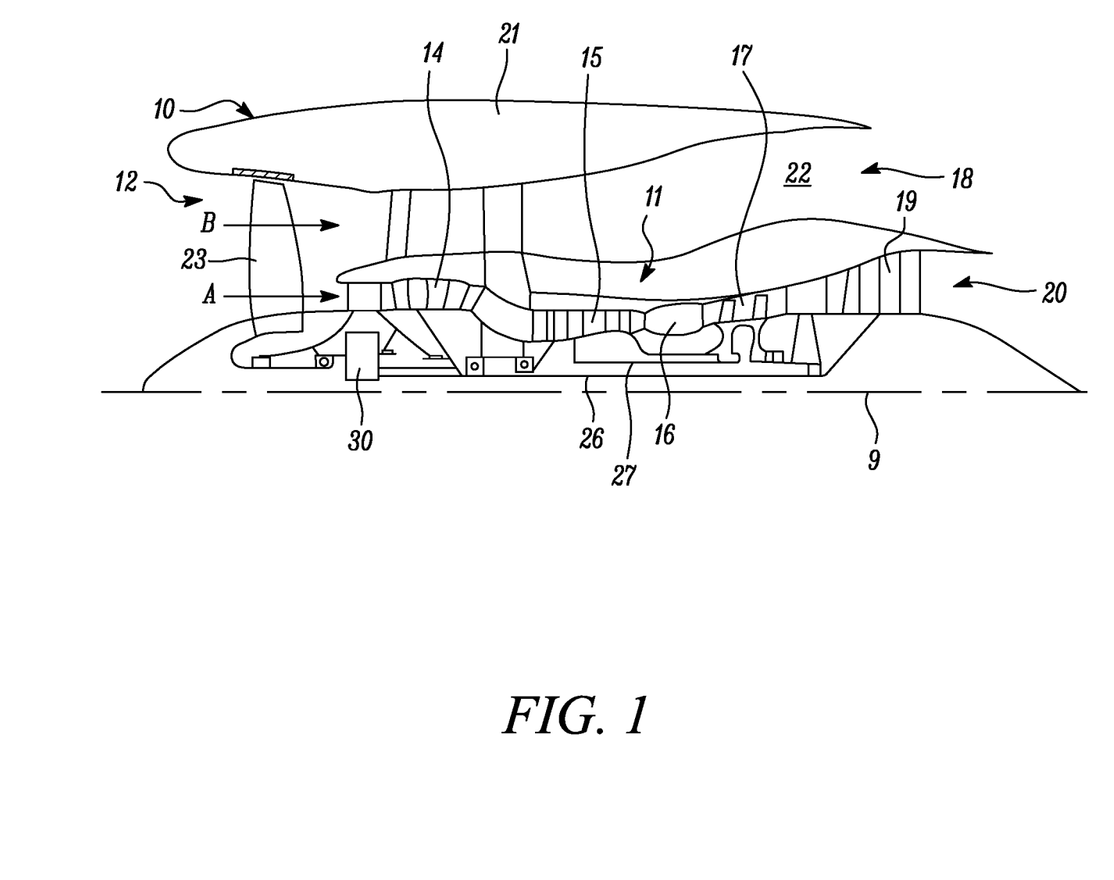
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high pressure compressor 15, combustion equipment 16, a high pressure turbine 17, a low pressure turbine 19, and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the core exhaust nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
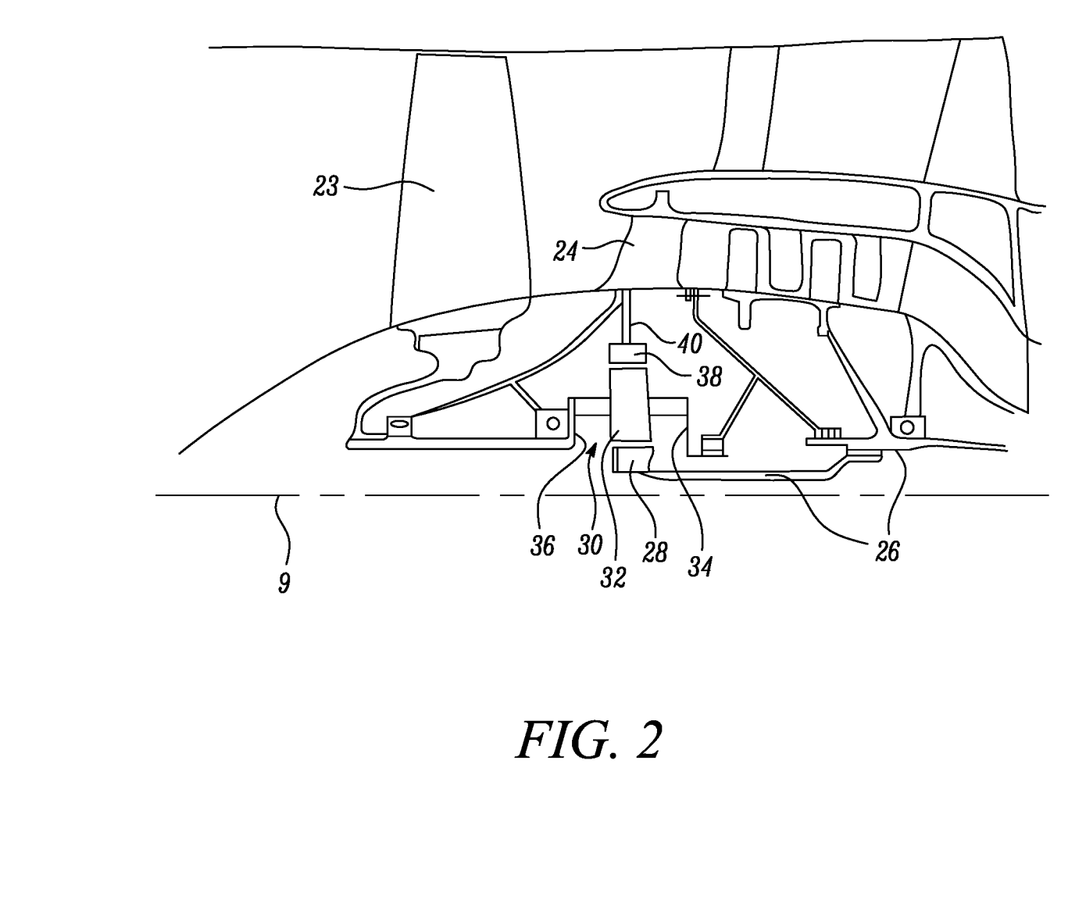
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to process around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e., not including the fan 23) respectively and/or the turbine and compressor stages that are connected together by the interconnecting shaft 26 with the lowest rotational speed in the engine (i.e., not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
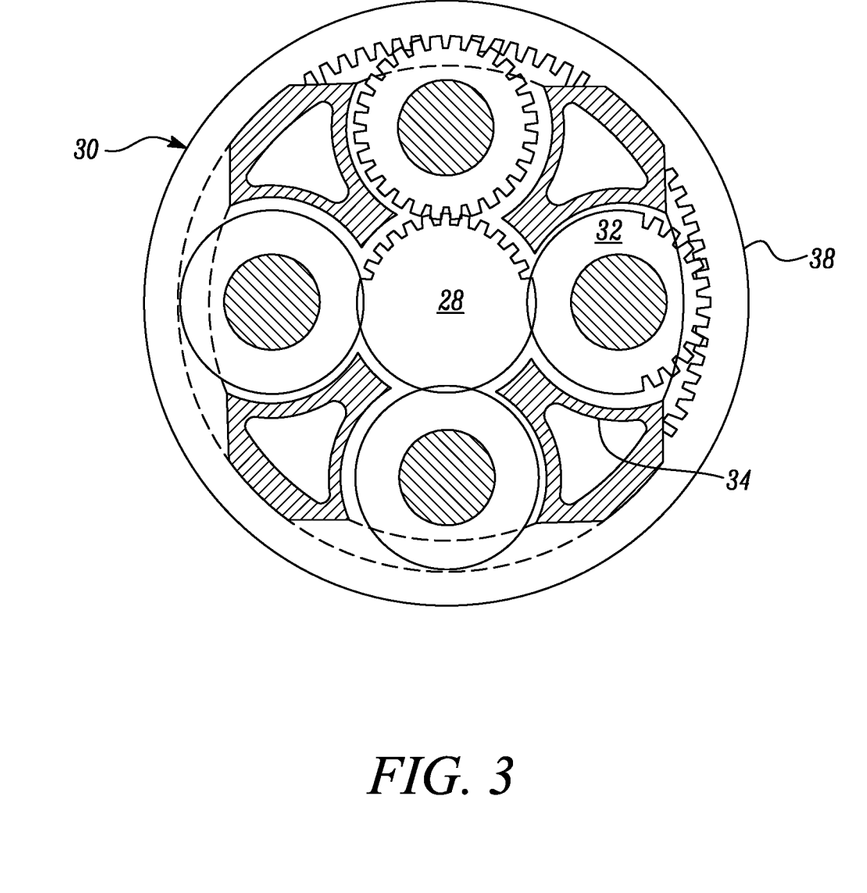
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the disclosure. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft, and the fixed structure 24) may have any desired degree of stiffness or flexibility. By way of further example, any suitable arrangement of the bearings between rotating and stationary parts of the engine (for example, between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g., the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core exhaust nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

As discussed above, in some embodiments, the gas turbine engine 10 may include the engine core 11 including the turbine 19, the compressor 14, and the core shaft 26 connecting the turbine 19 to the compressor 14. The gas turbine engine 10 may further include the fan 23 located upstream of the engine core 11. The fan 23 may include a plurality of fan blades. The gas turbine engine 10 may further include the gearbox 30 that receives an input from the core shaft 26 and outputs drive to the fan 23 so as to drive the fan 23 at a lower rotational speed than the core shaft 26. In some embodiments, the turbine may be a first turbine 19, the compressor may be a first compressor 14, and the core shaft may be a first core shaft 26. The engine core 11 may further include a second turbine 17, a second compressor 15, and a second core shaft 27 connecting the second turbine 17 to the second compressor 15. The second turbine 17, the second compressor 15, and the second core shaft 27 may be arranged to rotate at a higher rotational speed than the first core shaft 26.

Figure 4:
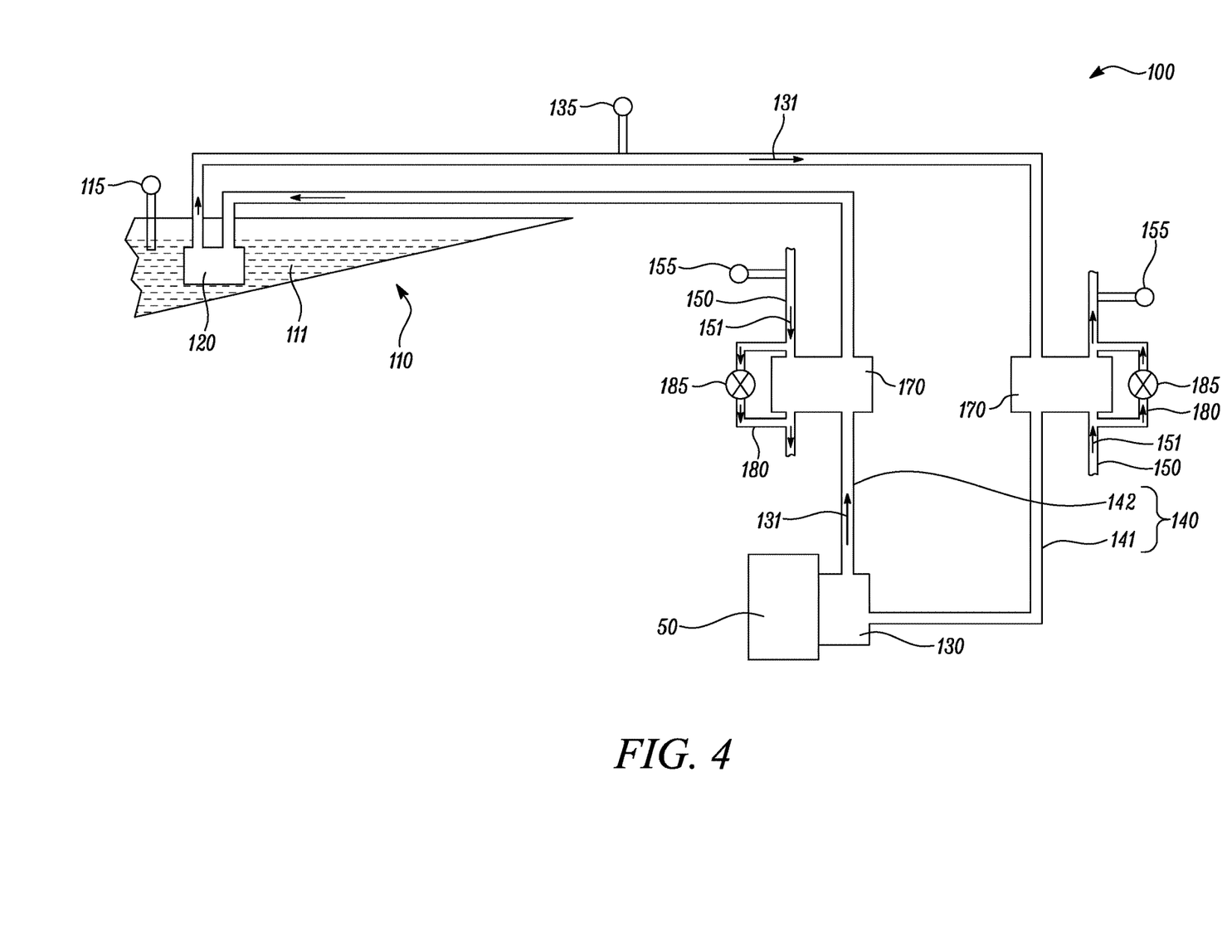
FIG. 4 is a schematic diagram of a heat management system of the present disclosure.

FIG. 4 shows a heat management system 100 for an aircraft (not shown) powered by the gas turbine engine 10 (shown in FIG. 1) in accordance with an embodiment of the present disclosure.

The heat management system 100 includes a fuel tank 110. In some embodiments, the fuel tank 110 may be an aircraft wing fuel tank. In other words, in some embodiments, the aircraft may include a wing, and the fuel tank 110 may be disposed within the wing.

The fuel tank 110 stores a fuel 111. The fuel 111 may include any fuel that is suitable for combustion by the gas turbine engine 10 (shown in FIG. 1). The fuel 111 may be delivered to the combustion equipment 16 (shown in FIG. 1) of the gas turbine engine 10, where the fuel 111 is mixed with air and the mixture is combusted.

The heat management system 100 further includes a first heat exchanger 120. The first heat exchanger 120 is thermally coupled to the fuel tank 110. The first heat exchanger 120 may enable transfer of heat to or from the fuel 111 stored in the fuel tank 110.

The heat management system 100 further includes a hydraulic pump 130 for circulating a hydraulic fluid 131 for hydraulically actuating one or more hydraulic components (not shown) of the aircraft. The hydraulic fluid 131 may be used to drive, for example, hydraulic actuators, landing gear, and other hydraulic components of the aircraft. The hydraulic fluid 131 is depicted by arrows in FIG. 4. The arrows depicting the hydraulic fluid 131 further show a flow direction of the hydraulic fluid 131.

The hydraulic pump 130 may include, for example, a variable displacement pump, such as a vane pump, a gear pump (e.g., a twin pinion gear pump), a piston pump, or any other suitable fixed or variable displacement pump. In some embodiments, the hydraulic pump 130 may be driven by an accessory gearbox 50. The accessory gearbox 50 may be driven by the gas turbine engine 10 (shown in FIG. 1). In the context of the present disclosure, the term "accessory gearbox" refers to a gearbox that is connected to some equipment or accessories of the gas turbine engine 10, such as, one or more electrical generators, fuel pumps, oil pumps, a starter motor, and the like.

The heat management system 100 further includes a hydraulic circuit 140. The hydraulic circuit 140 includes a first hydraulic line 141 fluidly coupled to the first heat exchanger 120 and the hydraulic pump 130. The hydraulic circuit 140 further includes a second hydraulic line 142 fluidly coupled to the first heat exchanger 120 and the hydraulic pump 130. Each of the first hydraulic line 141 and the second hydraulic line 142 may include a suitable configuration of piping, couplers, and the like. While not illustrated in FIG. 4, the heat management system 100 may further include a hydraulic reservoir that stores the hydraulic fluid 131. The hydraulic reservoir may be fluidly coupled to the hydraulic circuit 140.

The hydraulic pump 130 receives the hydraulic fluid 131 from the first heat exchanger 120 via the first hydraulic line 141. Further, the hydraulic pump 130 supplies the hydraulic fluid 131 to the first heat exchanger 120 via the second hydraulic line 142, such that the first heat exchanger 120 brings the hydraulic fluid 131 and the fuel 111 into a heat exchange relationship. The first heat exchanger 120 may therefore enable heat exchange or heat transfer between the hydraulic fluid 131 and the fuel 111.

In some embodiments, the heat management system 100 may further include a recirculation device (not shown) configured to recirculate the fuel 111 within the fuel tank 110. For example, the recirculation device may include a low-pressure pump (e.g., a gear pump) configured to recirculate the fuel 111 within the fuel tank 110. The recirculation device may ensure that the temperature of the fuel 111 remains uniform in the fuel tank 110. In other words, the recirculation device may prevent the fuel 111 from having a high localised temperature. The recirculation device may further improve heat transfer between the hydraulic fluid 131 and the fuel 111.

The heat management system 100 further includes an oil circuit 150 for circulating an oil 151 to lubricate one or more components 160 (shown in FIG. 6) of the gas turbine engine 10 (shown in FIG. 1) requiring lubrication. The oil circuit 150 is partially shown in FIG. 4 for illustrative purposes. Further, the oil 151 is depicted by arrows in FIG. 4. The arrows depicting the oil 151 further show a flow direction of the oil 151. In the context of the present disclosure, the term "oil" refers broadly to lubricants, such as oil-based and/or synthetic-based lubricants. The terms "oil" and "lubricant" are interchangeable herein.

The heat management system 100 further includes a second heat exchanger 170 thermally coupled to the oil circuit 150 and at least one of the first hydraulic line 141 and the second hydraulic line 142, such that the second heat exchanger 170 brings the hydraulic fluid 131 and the oil 151 into a heat exchange relationship, thereby allowing heat transfer between the fuel 111 and the oil 151 via the hydraulic fluid 131.

Each of the first heat exchanger 120 and the second heat exchanger 170 may include, but is not limited to, a shell and tube heat exchanger, a plate heat exchanger, and so forth.

The heat management system 100 may utilise the hydraulic fluid 131 to achieve heat transfer between the fuel 111 and the oil 151. The heat management system 100 may therefore manage the oil 151 and the fuel 111 at optimal operating temperatures when the aircraft undergoes extreme environmental conditions during flight. The heat management system 100 may maintain the temperature of the fuel 111 supplied from the aircraft (i.e., from the fuel tank 110) above 0° C., below which fuel-borne water becomes ice, by transferring heat from the oil 151 to the fuel 111 via the hydraulic fluid 131.

Furthermore, the heat management system 100 may improve an efficiency of the gas turbine engine 10, as the first heat exchanger may allow heat energy from the oil 151 to be added to the hydraulic fluid 131 and utilised to increase the temperature of the fuel 111 stored in the fuel tank 110 via the hydraulic fluid 131. Additionally, the heat energy added to the hydraulic fluid 131 from the oil 151 may be utilised for various functions of the aircraft.

Advantageously, the heat management system 100 may provide an integrated solution to temperature management of the oil 151 and the fuel 111. The heat management system 100 may make use of pre-existing systems (e.g., oil systems, hydraulic systems, and fuel systems) present in the gas turbine engine 10 (shown in FIG. 1) and the aircraft. As a result, the heat management system 100 may be economical to include in the aircraft and the gas turbine engine 10.

The heat management system 100 may further include various temperature sensors in order to maintain the fuel 111, the hydraulic fluid 131, and the oil 151 at the optimum operating temperatures.

Specifically, the heat management system 100 may further include a fuel temperature sensor 115 configured to sense the temperature of the fuel 111. The fuel temperature sensor 115 shown in FIG. 4 is disposed in thermal communication with the fuel 111 stored in the fuel tank 110, and therefore may sense the temperature of the fuel 111 in the fuel tank 110. It may be noted that the heat management system 100 may include a plurality of fuel temperature sensors 115 disposed at a respective plurality of positions on a fuel line to sense respective temperatures of the fuel 111 at the respective plurality of positions of the plurality of fuel temperature sensors 115.

The heat management system 100 may further include an oil temperature sensor 155 configured to sense the temperature of the oil 151. It may be noted that the heat management system 100 may include a plurality of oil temperature sensors 155 disposed at a respective plurality of positions on an oil line to sense respective temperatures of the oil 151 at the respective plurality of positions of the plurality of oil temperature sensors 155.

The heat management system 100 may further include a hydraulic fluid temperature sensor 135 configured to sense the temperature of the hydraulic fluid 131. While not illustrated in FIG. 4, the heat management system 100 may include a plurality of hydraulic fluid temperature sensors 135 disposed at a respective plurality of positions on the first hydraulic line 141 and the second hydraulic line 142 to sense respective temperatures of the hydraulic fluid 131 at the respective plurality of positions of the plurality of hydraulic fluid temperature sensors 135.

The fuel temperature sensor 115, the hydraulic fluid temperature sensor 135, and the oil temperature sensor 155 may include, for example, thermocouples, resistive temperature sensors, and the like. The heat management system 100 may utilise temperature data received from the fuel temperature sensor 115, the hydraulic fluid temperature sensor 135, and the oil temperature sensor 155 to maintain the fuel 111, the hydraulic fluid 131, and the oil 151 at the optimal operating temperatures.

Figure 5:
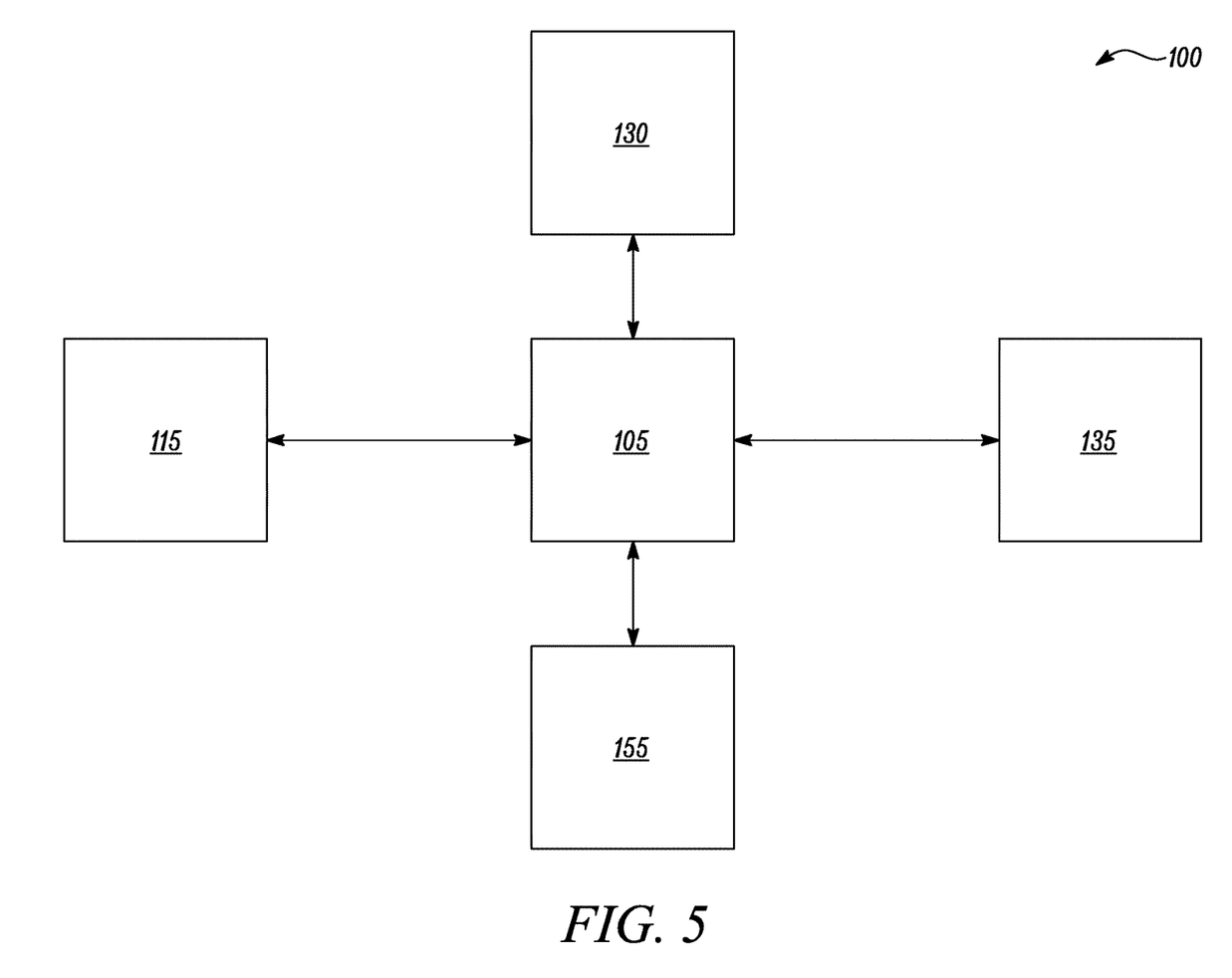
FIG. 5 is a schematic block diagram of the heat management system with some elements not shown.

FIG. 5 shows a schematic block diagram of the heat management system 100 with some elements thereof not shown for illustrative purposes.

Referring to FIGS. 4 and 5, the heat management system 100 may further include a controller 105. The controller 105 may include a full authority digital electronic computer (FADEC), electronic engine controller (EEC), engine control unit (ECU), Engine Health Monitoring Unit or Engine Monitoring Unit (EHM or EMU), and/or any other computing device or system. The controller 105 may include a processor (e.g., any type of processor, such as a multi-core processor or processing/controlling circuit, digital signal processor, etc.), a memory device that are combinations of read-only memory and random access memory, or other data storage devices, and the like.

The controller 105 may be communicably coupled to each of the fuel temperature sensor 115 and the oil temperature sensor 155. The controller 105 may further be communicably coupled to the hydraulic fluid temperature sensor 135. The controller 105 may determine the temperature of the fuel 111 via the fuel temperature sensor 115, the temperature of the hydraulic fluid 131 via the hydraulic fluid temperature sensor 135, and the temperature of oil 151 via the oil temperature sensor 155.

The controller 105 may be communicably coupled to the hydraulic pump 130. The controller 105 may control the hydraulic pump 130 to vary a flow of the hydraulic fluid 131 in the hydraulic circuit 140. Specifically, the controller 105 may be configured to control the hydraulic pump 130 to control the flow of the hydraulic fluid 131 in the hydraulic circuit 140 based on the temperature of the fuel 111 and the temperature of the oil 151.

For example, the controller 105 may control the hydraulic pump 130 to reduce the flow of the hydraulic fluid 131 in the hydraulic circuit 140. The reduction in the flow of the hydraulic fluid 131 in the hydraulic circuit 140 may increase a rate of heat exchange between the hydraulic fluid 131 and the oil 151, thereby increasing both a cooling rate of the oil 151 and a heating rate of the hydraulic fluid 131. The reduction in the flow of the hydraulic fluid 131 in the hydraulic circuit 140 may further reduce a rate of heat exchange between the hydraulic fluid 131 and the fuel 111, thereby reducing a heating rate of the fuel 111. The controller 105 may reduce the flow of the hydraulic fluid 131 in the hydraulic circuit 140, for example, if the temperature of the oil 151 is above a threshold oil temperature in order to reduce the temperature of the oil 151 below the threshold oil temperature.

Alternatively, the controller 105 may control the hydraulic pump 130 to increase the flow of the hydraulic fluid 131 in the hydraulic circuit 140. The increase in the flow of the hydraulic fluid 131 in the hydraulic circuit 140 may reduce the rate of heat exchange between the hydraulic fluid 131 and the oil 151, thereby reducing both the cooling rate of the oil 151 and the heating rate of the hydraulic fluid 131. The increase in the flow of the hydraulic fluid 131 in the hydraulic circuit 140 may further increase the rate of heat exchange between the hydraulic fluid 131 and the fuel 111, thereby increasing the heating rate of the fuel 111. The controller 105 may increase the flow of the hydraulic fluid 131 in the hydraulic circuit 140, for example, if the temperature of the hydraulic fluid 131 is above a threshold hydraulic fluid temperature in order to reduce the temperature of the hydraulic fluid 131 below the threshold hydraulic fluid temperature.

The heat management system 100 may further include a bypass line 180 fluidly coupled to the oil circuit 150, such that the bypass line 180 bypasses the second heat exchanger 170. The heat management system 100 may further include a valve 185 fluidly coupled to the bypass line 180 and operable to vary a flow of the oil 151 through the bypass line 180. In other words, the valve 185 may be controlled to vary the flow of oil 151 through the second heat exchanger 170 and the bypass line 180.

In some embodiments, the valve 185 may be an on/off valve. In other words, the valve 185 may have an on state in which the valve 185 allows unimpeded flow of the oil 151 through the bypass line 180, such that the oil 151 bypasses the second heat exchanger 170. The valve 185 may further have an off state in which the valve 185 prevents flow of the oil 151 through the bypass line 180, such that that the oil 151 passes through the second heat exchanger 170. The on/off valve may operate based on a pressure of the oil 151. In such embodiments, the heat management system 100 may passively control the valve 185 based on the pressure of the oil 151.

In some other embodiments, the valve 185 may be a variable position valve. In other words, the valve 185 may be a control valve. The valve 185 may include a valve body, an actuator, and a positioner, body assembly, and trim parts. In such embodiments, the valve 185 may enable precise control of the flow of the oil 151 in the bypass line 180. Further, the valve 185 may be controlled by the controller 105. Specifically, the valve 185 may be communicably coupled to the controller 105. The controller 105 may be configured to control the valve 185 to vary the flow of the oil 151 in the bypass line 180 based on the temperature of the fuel 111 and the temperature of the oil 151. For example, the controller 105 may open the valve 185, such that the oil 151 substantially bypasses the second heat exchanger 170 in order to reduce or prevent heat transfer between the oil 151 and the hydraulic fluid 131. The controller 105 may open the valve 185, for example, in case the temperature of the hydraulic fluid 131 is greater than acceptable hydraulic fluid temperature limits. Alternatively, the controller 105 may close the valve 185, such that the oil 151 substantially passes through the second heat exchanger 170 in order to increase heat transfer between the oil 151 and the hydraulic fluid 131. The controller 105 may close the valve 185, for example, in case the temperature of the oil 151 is greater than acceptable oil temperature limits.

Therefore, the controller 105 may control both the hydraulic pump 130 and the valve 185 in order to maintain the fuel 111, the hydraulic fluid 131, and the oil 151 under their respective acceptable temperature limits.

In the illustrated embodiment of FIG. 4, the heat management system 100 includes a plurality of second heat exchangers 170, more specifically, a pair of second heat exchangers 170. One of the pair of second heat exchangers 170 is thermally coupled to the oil circuit 150 and the first hydraulic line 141, and the other of the pair of second heat exchangers 170 is thermally coupled to the oil circuit 150 and the second hydraulic line 142. The heat management system 100 illustrated in FIG. 4 further includes a plurality of bypass lines 180 and a plurality of valves 185 corresponding to the plurality of second heat exchangers 170.

While not illustrated in FIG. 4, in some embodiments, the heat management system 100 may include a single second heat exchanger 170 thermally coupled to the oil circuit 150, and the first hydraulic line 141 or the second hydraulic line 142. Moreover, in some embodiments, the heat management system 100 may include a single second heat exchanger 170 thermally coupled to each of the first hydraulic line 141 and the second hydraulic line 142, and the oil circuit 150.

Figure 6:
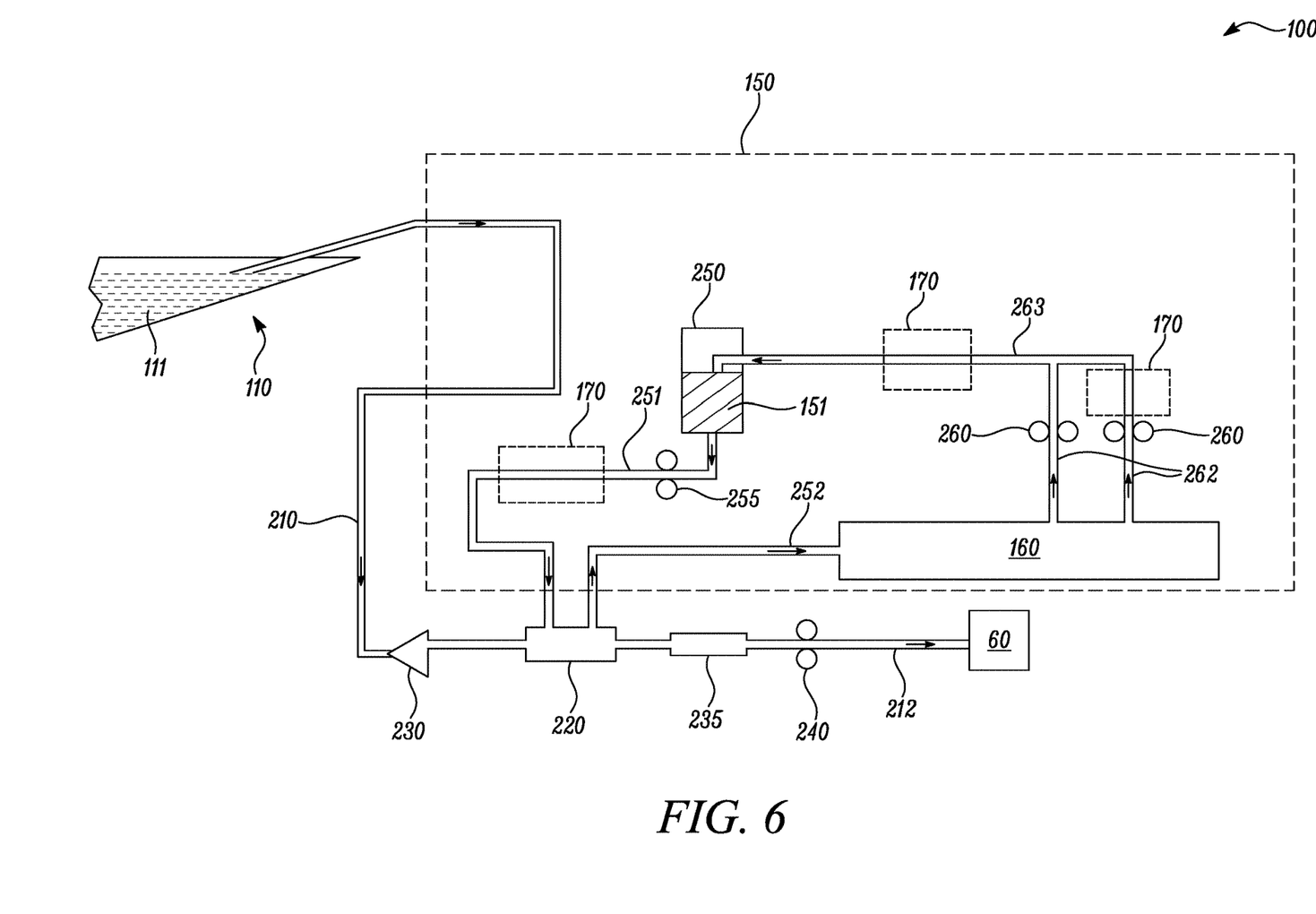
FIG. 6 is a schematic diagram of a portion of the heat management system of the present disclosure.

FIG. 6 shows a schematic diagram of a portion of the heat management system 100 in accordance with an embodiment of the present disclosure. Some elements of the heat management system 100 are not shown in FIG. 6 for illustrative purposes.

The heat management system 100 may further include a fuel line 210 fluidly coupled to the fuel tank 110. The fuel line 210 may be configured to transport the fuel 111 from the fuel tank 110 to an engine line 212 that is in fluid communication with one or more burners 60 (schematically depicted by a block in FIG. 6) of the gas turbine engine 10. The combustion equipment 16 (shown in FIG. 1) may include the one or more burners 60.

The heat management system 100 may further include a fuel-oil heat exchanger (FOHE) 220 fluidly coupled to the fuel line 210 and the oil circuit 150, such that the FOHE 220 brings the fuel 111 and the oil 151 into a heat exchange relationship. The FOHE 220 may enable heat exchange between the fuel 111 and the oil 151 before the fuel 111 is supplied to the one or more burners 60. The FOHE 220 may include, but is not limited to, a shell and tube heat exchanger, a plate heat exchanger, and so forth.

The heat management system 100 may further include a low pressure fuel pump 230 configured to supply the fuel 111 from the fuel tank 110 to the FOHE 220 via the fuel line 210. The heat management system 100 may further include a high pressure fuel pump 240 configured to receive the fuel 111 from the FOHE 220 and supply the fuel 111 to the engine line 212 that is in fluid communication with the one or more burners 60 of the gas turbine engine 10.

The heat management system 100 may further include a filter 235 fluidly disposed between the FOHE 220 and the high pressure fuel pump 240. The filter 235 may filter the fuel 111 received from the FOHE 220 before it is supplied to the one or more burners 60. The FOHE 220 may transfer heat from the oil 151 to the fuel 111, such that the temperature of the fuel 111 is increased above a predetermined temperature in order to prevent formation of ice, thereby preventing a blockage of the filter 235.

The heat management system 100 may further include an oil tank 250. The oil tank 250 may store the oil 151. The oil tank 250 may include a deaerator to remove air and other gases from the oil 151 stored therein. The heat management system 100 may further include an oil pump 255 configured to supply the oil 151 from the oil tank 250 to the FOHE 220. The heat management system 100 may further include a scavenge pump 260 configured to scavenge and supply the oil 151 from the one or more components 160 of the gas turbine engine 10 to the oil tank 250. The heat management system 100 may therefore circulate the oil 151 between the oil tank 250 and the one or more components 160.

Specifically, the oil circuit 150 may include a first oil line 251 fluidly coupled to the oil tank 250 and the FOHE 220. The oil pump 255 may be configured to supply the oil 151 from the oil tank 250 to the FOHE 220 via the first oil line 251. The oil circuit 150 may further include a second oil line 252 fluidly coupled to the FOHE 220 and the one or more components 160. The second oil line 254 may be configured to supply the oil 151 from the FOHE 220 to the one or more components 160. The oil circuit 150 may further include a scavenge line 262 fluidly coupled to the one or more components 160 of the gas turbine engine 10 and the oil tank 250. The scavenge pump 260 may be configured to supply the oil 151 from the one or more components 160 to the oil tank 250 via the scavenge line 262.

Each of the low pressure fuel pump 230, the high pressure fuel pump 240, the oil pump 255, and the scavenge pump 260 may include, for example, a variable displacement pump, such as a vane pump, a gear pump (e.g., a twin pinion gear pump), a piston pump, or any other suitable fixed or variable displacement pump.

The one or more components 160 requiring lubrication may include, for example, bearings, turbo machinery, a gearbox, such as a power gear box (PGB), and the like.

As shown in FIG. 6, the second heat exchanger 170 may be thermally coupled to the oil circuit 150 at different locations. The second heat exchanger 170 is schematically represented at the different locations by dashed lines.

In some embodiments, the second heat exchanger 170 may be thermally coupled to the first oil line 251 and the at least one of the first hydraulic line 141 and the second hydraulic line 142 (shown in FIG. 4). In such embodiments, the heat transfer from the oil 151 to the fuel 111 may be reduced, such that a rise in the temperature of fuel 111 is not excessive.

In some embodiments, the second heat exchanger 170 may be thermally coupled to the scavenge line 262 and the at least one of the first hydraulic line 141 and the second hydraulic line 142.

In the illustrated embodiment of FIG. 6, the oil circuit 150 includes a plurality of scavenge lines 262 fluidly coupled to the one or more components 160 and a plurality of scavenge pumps 260 corresponding to the plurality of scavenge lines 262. The plurality of scavenge lines 262 may converge to a combined scavenge line 263. In some embodiments, the second heat exchanger 170 may be thermally coupled to the combined scavenge line 263 and the at least one of the first hydraulic line 141 and the second hydraulic line 142 (shown in FIG. 4).

The second heat exchanger 170 may perform adequately considering aeration of the oil 151 that is scavenged via the scavenge line 262 and the combined scavenge line 263. Thus, the heat management system 100 may operate effectively if the second heat exchanger 170 is located at any of the different locations described above.

Moreover, the second heat exchanger 170 in the different locations described above may ensure that a difference between the temperature of the oil 151 and the temperature of hydraulic fluid 131 remains below a predetermined temperature difference to minimise a risk of deterioration of the hydraulic fluid 131.

In some embodiments, the gas turbine engine 10 (shown in FIG. 1) may include the heat management system 100. In some embodiments, an aircraft may include the gas turbine engine 10 (shown in FIG. 1). In some embodiments, the aircraft may further include the heat management system 100.

It will be understood that the disclosure is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A heat management system for an aircraft powered by a gas turbine engine, the heat management system comprising:
   a fuel tank storing a fuel;
   a first heat exchanger thermally coupled to the fuel tank;
   a hydraulic pump for circulating a hydraulic fluid for hydraulically actuating one or more hydraulic components of the aircraft;
   a hydraulic circuit comprising:
      a first hydraulic line fluidly coupled to the first heat exchanger and the hydraulic pump, wherein the hydraulic pump receives the hydraulic fluid from the first heat exchanger via the first hydraulic line; and
      a second hydraulic line fluidly coupled to the first heat exchanger and the hydraulic pump, wherein the hydraulic pump supplies the hydraulic fluid to the first heat exchanger via the second hydraulic line, such that the first heat exchanger brings the hydraulic fluid and the fuel into a heat exchange relationship;
   an oil circuit for circulating an oil to lubricate one or more components of the gas turbine engine requiring lubrication; and
   a second heat exchanger thermally coupled to the oil circuit and at least one of the first hydraulic line and the second hydraulic line, such that the second heat exchanger brings the hydraulic fluid and the oil into a heat exchange relationship, thereby allowing heat transfer between the fuel and the oil via the hydraulic fluid.

2. The heat management system of claim 1, further comprising:
   a fuel line fluidly coupled to the fuel tank;
   a fuel-oil heat exchanger fluidly coupled to the fuel line and the oil circuit, such that the fuel-oil heat exchanger brings the fuel and the oil into a heat exchange relationship;
   a low pressure fuel pump configured to supply the fuel from the fuel tank to the fuel-oil heat exchanger via the fuel line; and
   a high pressure fuel pump configured to receive the fuel from the fuel-oil heat exchanger and supply the fuel to an engine line that is in fluid communication with one or more burners of the gas turbine engine.

3. The heat management system of claim 2, further comprising:
   an oil tank storing the oil;
   an oil pump configured to supply the oil from the oil tank to the fuel-oil heat exchanger; and
   a scavenge pump configured to scavenge and supply the oil from the one or more components of the gas turbine engine to the oil tank.

4. The heat management system of claim 3, wherein the oil circuit comprises:
   a first oil line fluidly coupled to the oil tank and the fuel-oil heat exchanger, wherein the oil pump is configured to supply the oil from the oil tank to the fuel-oil heat exchanger via the first oil line;
   a second oil line fluidly coupled to the fuel-oil heat exchanger and the one or more components, wherein the second oil line is configured to supply the oil from the fuel-oil heat exchanger to the one or more components; and
   a scavenge line fluidly coupled to the one or more components of the gas turbine engine and the oil tank, wherein the scavenge pump is configured to supply the oil from the one or more components to the oil tank via the scavenge line.

5. The heat management system of claim 4, wherein the second heat exchanger is thermally coupled to the first oil line and the at least one of the first hydraulic line and the second hydraulic line.

6. The heat management system of claim 4, wherein the second heat exchanger is thermally coupled to the scavenge line and the at least one of the first hydraulic line and the second hydraulic line.

7. The heat management system of claim 1, further comprising:
   a bypass line fluidly coupled to the oil circuit, such that the bypass line bypasses the second heat exchanger; and
   a valve fluidly coupled to the bypass line and operable to vary a flow of the oil through the bypass line.

8. The heat management system of claim 7, wherein the valve is a variable position valve.

9. The heat management system of claim 7, further comprising:
   a fuel temperature sensor configured to sense a temperature of the fuel;
   an oil temperature sensor configured to sense a temperature of the oil; and
   a controller communicably coupled to each of the fuel temperature sensor and the oil temperature sensor, wherein the controller is configured to control the valve to vary the flow of the oil in the bypass line based on the temperature of the fuel and the temperature of the oil.

10. The heat management system of claim 1, further comprising:
   a fuel temperature sensor configured to sense a temperature of the fuel;
   an oil temperature sensor configured to sense a temperature of the oil; and
   a controller communicably coupled to each of the fuel temperature sensor and the oil temperature sensor, wherein the controller is configured to control the hydraulic pump to control a flow of the hydraulic fluid in the hydraulic circuit based on the temperature of the fuel and the temperature of the oil.

11. A gas turbine engine and a heat management system for an aircraft, the gas turbine engine comprising:
   an engine core comprising a turbine, a compressor, and a core shaft connecting the turbine to the compressor;
   a fan located upstream of the engine core, the fan comprising a plurality of fan blades; and
   a gearbox that receives an input from the core shaft and outputs drive to the fan so as to drive the fan at a lower rotational speed than the core shaft; and the heat management system comprising a heat management system according to claim 1.

12. The gas turbine engine and the heat management system of claim 11, wherein:
   the turbine is a first turbine, the compressor is a first compressor, and the core shaft is a first core shaft;
   the engine core further comprises a second turbine, a second compressor, and a second core shaft connecting the second turbine to the second compressor; and
   the second turbine, the second compressor, and the second core shaft are arranged to rotate at a higher rotational speed than the first core shaft.

13. An aircraft including a heat management system according to claim 1.

* * * * *